_Patented Apr. 5, 1949_                                     2,466,035

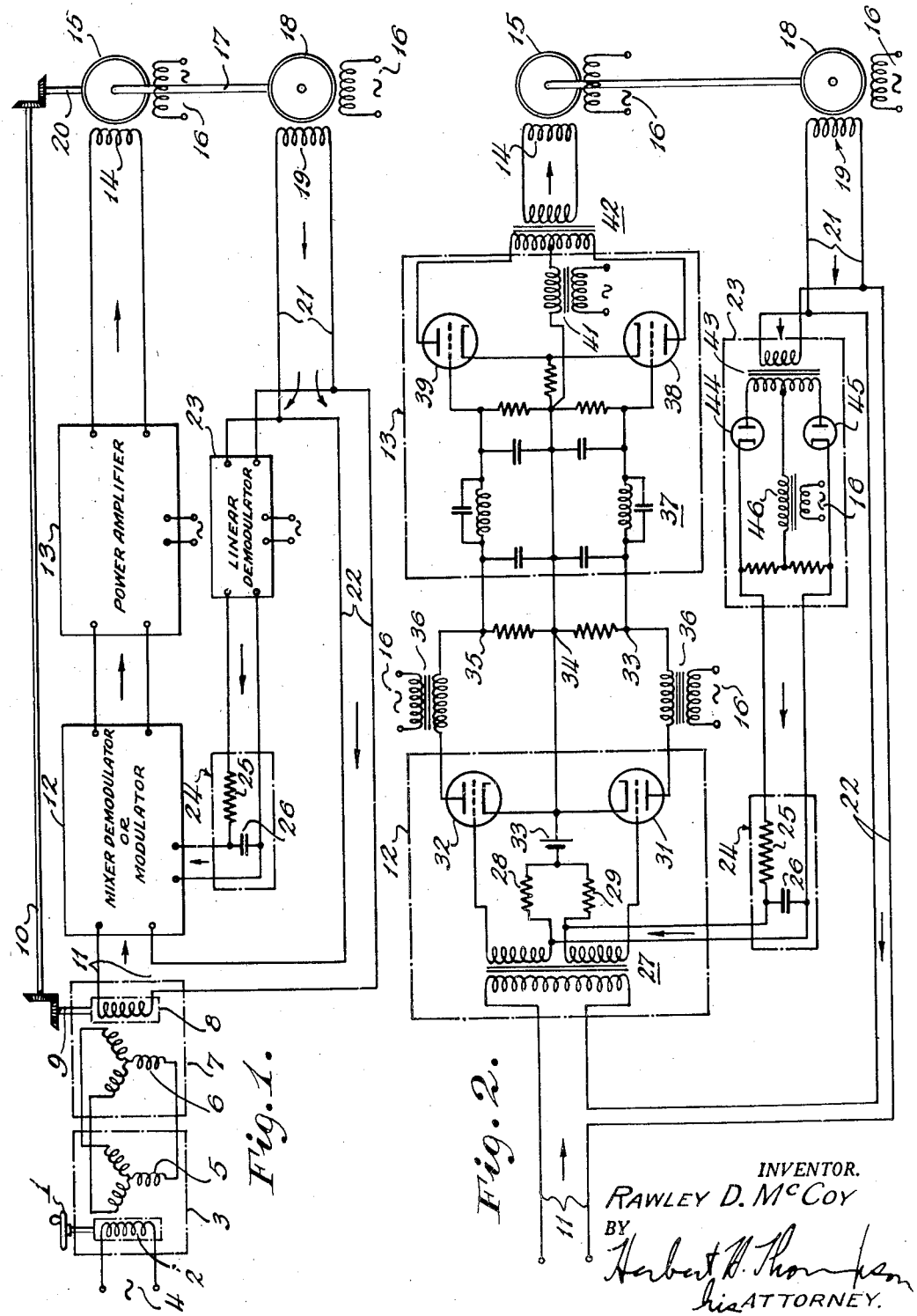

UNITED STATES PATENT OFFICE 2,466,035

ELECTRIC SERVOMOTOR SYSTEM

Rawley D. McCoy, Bronxville, N. Y., assignor to The Sperry Corporation, a corporation of Delaware Application February 28, 1947, Serial No. 731,469

6 Claims. (Cl. 318—30)

This invention relates to servomotor systems, and, in particular, to improvements in servomotor systems of the type having speed signal generating means for damping or stabilizing servomotor operation.

In servomotor systems that are employed to move or rotate a remote object in response to an error signal emanating from a reference device, objectionable hunting of the servomotor is encountered. To overcome this objectionable aspect of servomotor systems, Riggs, in U. S. Patent No. 2,115,086 incorporates an A. C. eddy-current generator also sometimes known as a "dynamic transformer," driven by the servomotor and productive of an A. C. signal voltage of a phase dependent on the direction of rotation and of an amplitude that is proportional to the speed of the servomotor. By applying this speed signal in a sense opposing the error signal from the reference device, the servomotor is thereby stabilized and objectionable hunting prevented. However, in the system disclosed by Riggs, lag errors appear that are proportional to the output speed of the servomotor.

It is, therefore, the primary object of this invention to provide an improved method for damping servomotor operation while simultaneously reducing or eliminating speed lag.

Another object of this invention is to provide a servo motor system having an A. C. speed voltage, or an eddy-current generator, with means for overcoming lag characteristics that are due to the degenerative connection of the speed signal. More particularly, the means herein provided to overcome inherent lag characteristics, include electrical circuit means as distinguished from mechanical means such as are disclosed, for example, in the application of Raymond C. Goertz, application Serial No. 608,052, filed July 31, 1945.

It is a further object of the instant invention to provide means in a servo system, for producing a feed-back voltage which is combined in a degenerative sense with an error signal to control the servomotor, which feed-back voltage is substantially reduced to zero under a steady state or constant speed condition of the servomotor, while increasing oscillatory conditions or periods of acceleration or deceleration of the servomotor.

A still further object of the instant invention is to provide a servomotor system with an A. C. speed signal, which signal is combined with the error signal in a degenerative sense, and a D. C. speed signal, which signal is combined with the error signal in a regenerative sense.

The invention also relates to the novel features or principles of the instrumentalities described herein, whether or not such are used for the stated objects, or in the stated fields or combinations.

In the drawing like numerals refer to similar parts throughout the several views of which:

Fig. 1 illustrates a block diagram of the instant invention; and

Fig. 2 illustrates details of the component parts of Fig. 1.

Referring now to Fig. 1 of the drawing, a reference device, which may be of any of the many well-known types, illustrated as including the reference device 1, having operatively associated therewith the rotor 2 of a conventional synchrotransformer 3 which may be of the "Selsyn," "Telegon," or Autosyn" type well known in the art. The rotor winding 2 is energized by a source of alternating current 4, and induces a voltage in stator winding 5 which is connected to a corresponding winding 6 of a second transformer 7 having a rotor winding 8 positioned by shafts 9 and 10 according to the position of the member 20 controlled by the servomotor 15. This reference device, productive of an error signal or control voltage which appears across the lines 11 and this error signal, except in the manner modified as hereinafter set forth, is transmitted through a mixer demodulator 12 to a power amplifier 13 whose output serves to excite winding 14 of the servomotor 15, thereby causing the servomotor to be driven in accordance with the error signal that appeared across 11. The other winding of servomotor 15 is energized from an alternating current source 16. Directly associated with the servomotor 15 by means of the driving shaft 17, is an eddy-current generator 18. Generator 18 is energized by alternating current 16, and is productive of a speed signal or speed voltage in the winding 19, which signal varies in accordance with the speed of the generator 18, and by virtue of the association of generator 18 with servomotor 15 through shaft 17. The voltage generated in the winding 19 is proportional to servomotor speed and has a phase sense dependent upon the direction of rotation. The voltage that is generated in winding 19, hereinafter known as the "speed voltage," is transmitted by lines 21 and 22 to mix with the error signal received by the system on the windings 11, but in an opposing or degenerative sense. Where the system is a follow-up system, the servomotor operating to drive an object in substantial synchronism with a reference, this speed voltage produces an increased lag between the object and the reference due to the degenerative effect of the speed voltage.

In the circuit thus far considered, a considerable lag is created between the error signal and servomotor operation. To overcome this handicap, the speed signal generated in winding 19 is transmitted along lines 21 and supplied to the linear demodulator 23. This demodulator 23 receives the alternating current speed voltage, demodulates it to substantially unidirectional voltage, whereupon the demodulated speed voltage is transmitted through the resistance-capacitance circuit 23, including resistance 25 and the capacitance 26. From this resistance-capacitance network the demodulated speed signal is applied to the mixer demodulator 12. As the mixer demodulator 12 (to be later explained in more detail) has an equal gain for A. C. and D. C. input signals and, inasmuch as the demodulated speed signal is delayed in time by the resistance-capacitance network 24 and then inserted into the mixer 12 in a sense aiding the error signal 12, or in a regenerative sense, speed lag is effectively overcome during steady state operation. More specifically, during a steady state condition of servomotor operation, the demodulated speed signal, after passing through the resistance-capacitance network 24, becomes substantially equal to the speed signal that is supplied along lines 22. As the speed signal from the lines 22 is placed in opposition to the error signal and as the demodulated and time-delayed speed signal from network 24 is entered into the demodulator 12 in a sense aiding the error signal, the net result during a steady state servomotor condition will be that the error voltage 11 alone will be effective to govern servomotor operation and speed lag will be effectively eliminated. During oscillatory conditions including acceleration or deceleration of the servomotor 15, in response to similar error signal variations, the network 24 and particularly the condenser 26 loses its infinite impedance and in conjunction with the resistance 25, serves as a phase shifting network for the demodulated speed signal. As the frequency of oscillation increases the signal output from the network 24 will decrease and the effectiveness of the speed signal 22 in damping servomotor operation will become greater.

Thus, for given error signal productive of a steady servomotor speed, a pair of speed signals will be generated one being an A. C. signal and the other being a time-delayed D. C. signal. As these speed signals are inserted into an amplifier having equal gain for A. C. and D. C. input signals, and further, as the A. C. signal is inserted in the amplifier in a degenerative sense, and the D. C. signal is inserted in a regenerative sense, their net effect will be to provide lag free operation during the steady state condition of the servo system. During this steady state condition, the error signal alone will be operative in producing servomotor displacement. In this manner, a system completely free of speed lag during constant speed condition is provided.

During periods of oscillation such as would occur if the error signal were oscillating or was changing in a sense to cause an acceleration or deceleration of the servomotor 15, the immediate effect of the output from the eddy-current generator 18 would be to increase the A. C. speed signal component appearing on line 22 thereby causing speed damping and simultaneously, after a slight delay (caused by the condenser-resistor circuit 24) the demodulated part of the speed signal or the D. C. speed signal will appear to augment the error signal received from lines 11, thereby overcoming any lag tendencies that the system would otherwise have.

As the frequency of oscillation increases, the effectiveness of the condenser 26, insofar as providing an impedance is concerned, is greatly decreased compared with the steady state condition, and thusly, the D. C. speed-signal that opposes damping during a steady state, is diminished, allowing the A. C. speed signal appearing along lines 22 to have a greater effect insofar as damping is concerned. Thus, as the servomotor speed decelerates or approaches zero, the A. C. speed signal from lines 22 is very effective in providing the desired speed damping.

The diagram of Fig. 2 is similar in all major respects to the diagram in Fig. 1, excepting insofar as Fig. 2 illustrates preferable internal components of several of the elements that were illustrated in block form in Fig. 1.

The mixer demodulator 12 is illustrated as comprising a transformer 27 for receiving the combined error signal and what may be termed the A. C. speed signal (that is, the speed signal transmitted along lines 22). The D. C. speed signal is received from the demodulator 23, which is of conventional design and may include input transformer 43, rectifying tubes 44 and 45 and transformer 46 which is energized by A. C. source 16. The resistor capacitance network 24 then receives the demodulated or D. C. speed signal whereupon it is inserted into the mixer demodulator 12 on the secondary windings of the input transformer 27. The remainder of this balanced demodulator 12 is of a design well known to the art and includes resistors 28 and 29 and the triodes 31 and 32, these triodes having a D. C. grid bias 33. The demodulator 12 is productive of a linear output which appears across the plate circuits of the tubes 31 and 32 and is transmitted therefrom as an input to the power amplifier 13. The unidirectional signal voltage appearing between point 33 and the midpoint 34 in the output of the demodulator or between point 35 and the midpoint 34 will provide a differential voltage across 33 and 35 of a magnitude and polarity dependent respectively upon the amplitude and phase sense of the error signal across lines 11.

An A. C. source 16 of reference voltage, preferably the same as that from which the primary control appearing across lines 11 is derived, feeds the two primary windings of the transformers 36 and the secondaries thereof supply plate potentials to the plates of tubes 31 and 32. The unidirectional voltage from the demodulator 12 is thereupon transmitted to the filter network generally identified as 37. The filtered signal is then applied in differential fashion and in opposite polarity sense to the grids of the triodes 38 and 39. Transformer 41 supplies plate voltage to the plates of tubes 38 and 39. The plate circuits of tubes 38 and 39 are connected across the center-tapped primary of coupling transformer 42, and the secondary thereof is connected to energize one phase of the servomotor 15, herein represented for exemplary purposes as a two-phase motor. The servomotor is therefore driven in accordance with the error signal opposed by the A. C. speed signal which in turn is opposed, but with a time delay, by the demodulated or D. C. speed signal.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a servomotor system, a motor, a source of control signal voltage, amplifier means for controlling the rate and direction of operation of said motor in accordance with the magnitude and polarity sense of said signal, an alternating current speed generator driven by said motor for supplying an alternating voltage having an amplitude proportional to the speed of the motor and of a phase sense dependent upon the direction of motor operation, a feed-back circuit for applying said speed voltage in degenerative fashion to said amplifier, and a second feed-back circuit connected to receive said speed voltage and including means for delaying the transmission of signal voltages therethrough, said second feed-back circuit being connected to apply the delayed signal voltage in regenerative fashion to said amplifier.

2. In a servomotor system, a motor, a source of control signal voltage, amplifier means for controlling the operation of said motor in accordance with said signal, generator means operatively associated with said motor and having an output voltage proportional to motor speed, circuit means for applying said speed voltage in degenerative fashion to said amplifier, and means connected to receive said speed voltage including means for delaying the transmission of signal voltages therethrough, said last-mentioned means being arranged to apply said delayed signal voltage in a regenerative fashion to said amplifier.

3. In a servomotor system, a motor, a source of control signal voltage, amplifier means for controlling the operation of said motor in accordance with said signal, generator means operatively associated with said motor and having an alternating current output voltage proportional to motor speed, circuit means for applying said alternating current speed voltage in a degenerative fashion to said amplifier, and demodulator means connected to receive and demodulate said speed voltage including resistance-capacitance circuit means for delaying the transmission of signal voltages therethrough, said demodulator means being connected to apply said delayed and demodulated signal voltage in a regenerative fashion to said amplifier.

4. In a servomotor system, a motor, a source of control signal voltage, amplifier means having an equal gain for alternating current and direct current input for controlling the operation of said motor in accordance with said signal, generator means operatively associated with said motor and having an alternating current output voltage proportional to motor speed, circuit means for applying said alternating current speed voltage in degenerative fashion to said amplifier, and demodulator means connected to receive said speed voltage and including means for delaying the transmission of signal voltages therethrough, said demodulator means being connected to apply said delayed and demodulated signal voltage in a regenerative fashion to said amplifier.

5. In a servomotor system, a servomotor, an error signal source, and means for damping servomotor operation, means for preventing lag between said servomotor and said error signal comprising generating means having an alternating current output voltage responsive to servomotor speed, demodulating means for receiving said speed responsive voltage, means connected to receive and delay said demodulated speed voltage, and circuit means connecting said delayed and demodulated speed voltage in a regenerative sense with said error signal.

6. In a servomotor system, an error signal source, a servomotor operatively connected to said error signal source to be driven in response thereto, signal generating means for producing an output voltage in accordance with servomotor speed, circuit means connecting said output voltage in a degenerative sense with said error signal, a second circuit means connected to receive said output voltage and including means for delaying the passage of voltages therethrough, said delayed voltages being connected in a regenerative sense with said error signal.

RAWLEY D. McCOY.

REFERENCES CITED

The following references are of record in the file of this patent:

UNITED STATES PATENTS

| Number | Name | Date |
|---|---|---|
| 2,352,103 | Jones | June 20, 1944 |